J. W. MILLER.
DETACHABLE AND SECTIONAL RIM FOR VEHICLE WHEELS.
APPLICATION FILED MAY 17, 1907. RENEWED APR. 26, 1910.
976,900.  Patented Nov. 29, 1910.
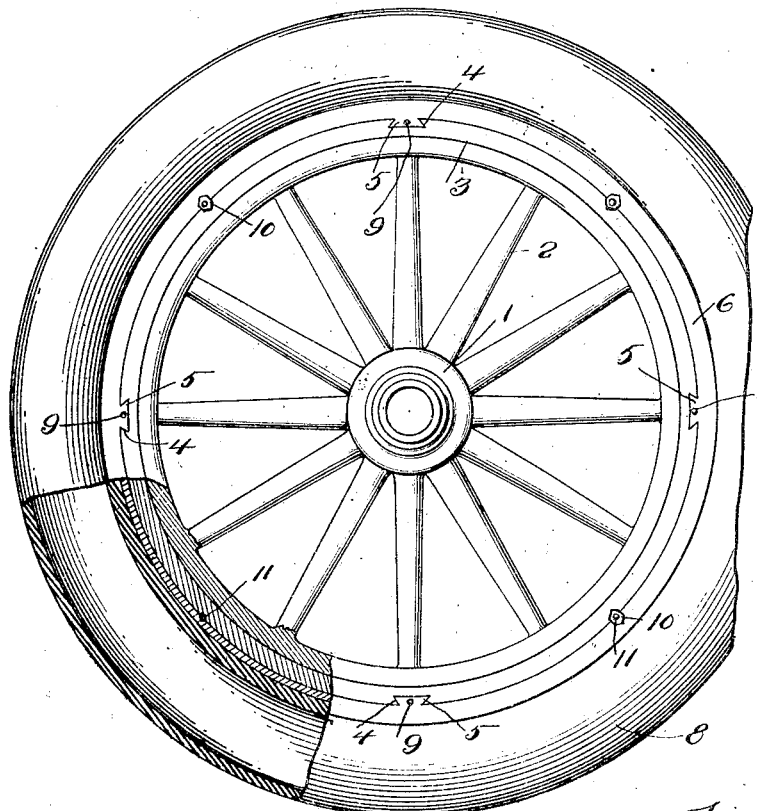
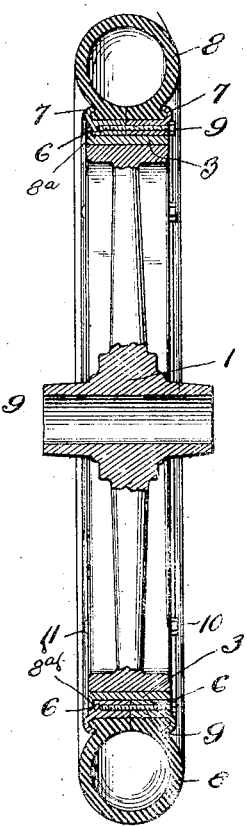
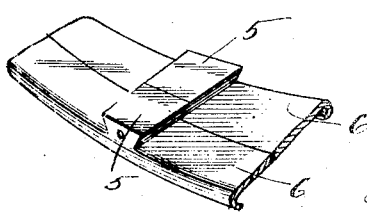
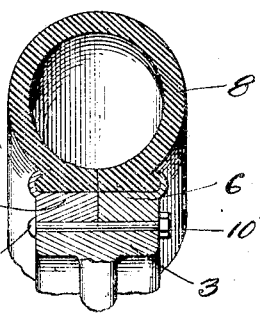
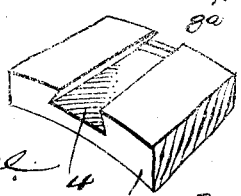
WITNESSES:
Samuel Payne
N. H. Butler
INVENTOR
J. W. Miller.
BY H. C. Everitt Co.
Attorneys

UNITED STATES PATENT OFFICE.

JOHN W. MILLER, OF SOUTH SHARON, PENNSYLVANIA.

DETACHABLE AND SECTIONAL RIM FOR VEHICLE-WHEELS.

976,900. Specification of Letters Patent. Patented Nov. 29, 1910.

Application filed May 17, 1907, Serial No. 374,119. Renewed April 26, 1910. Serial No. 557,824.

*To all whom it may concern:*

Be it known that I, JOHN W. MILLER, a citizen of the United States of America, residing at South Sharon, in the county of Mercer and State of Pennsylvania, have invented certain new and useful Improvements in Detachable and Sectional Rims for Vehicle-Wheels, of which the following is a specification, reference being had therein to the accompanying drawing.

This invention relates to improvements in detachable and sectional rims for vehicle wheels, particularly automobile and motor driven vehicles.

The invention has for its object to provide a sectional rim for vehicle wheels that can be easily and quickly detached from a rim when it is desired to remove the tire carried by the rim.

My invention aims to provide a rim for automobile wheels, the parts of which can be disassembled to permit of a new inflated tire being placed upon a wheel. In this connection, my improved rim is adapted to save considerable time and labor when it is necessary to renew and repair a tire upon an automobile wheel. To this end, I construct a rim in sections and suitably secure the rim to the felly of a wheel, the sectional rim detachably holding a tire. This construction permits of a rim being secured to a tire and carried upon an automobile whereby should a tire being used be punctured or injured, the tire and its rim can be quickly removed and a new tire and rim placed in position upon the wheel. This operation is accomplished much quicker than by changing the tires upon a fixed rim.

The detail construction entering into my invention will be hereinafter more fully described and then specifically pointed out in the appended claims.

Referring to the drawing forming part of this specification, like numerals of reference designate corresponding parts throughout the several views, in which:

Figure 1 is an elevation partly in section of an automobile wheel equipped with the rim, Fig. 2 is a vertical sectional view of the same. Fig. 3 is a detail perspective view of a portion of a rim, Fig. 4 is an enlarged cross sectional view of a portion of my rim, Fig. 5 is a perspective view of a portion of the felly of a wheel.

In the accompanying drawing, I have illustrated an automobile wheel consisting of a hub 1, radiating spokes 2 and a felly 3, said felly being provided with four equally spaced transverse dove-tail tapering grooves 4, and adapted to fit in said grooves are depending dove-tail tapering tongues 5 carried by the sections 6 of a rim, the rim being provided with clenchers 7 for engaging a resilient tire 8. To limit the movement of the tongues 5 within the grooves 4, and preventing said tongues from being wedged therein and causing considerable trouble when it is desired to remove the rim, I provide the inside face of the felly with a bead or flange 8$^a$. The tongues 5 of the sections 6 are held together by screw bolts 9. The sectional rim is held in engagement with the felly 3 by four equally spaced bolts and nuts 10, the heads 11 of the bolts and nuts thereof prevent the rim from shifting laterally upon the felly of the wheel, while the tongues 5 of the sections 6 of the rim prevent said rim from shifting upon the felly.

The novel construction of the detachable sectional rim permits of the entire rim being removed by simply removing the bolts and nuts 10, and then if it is desired to remove the tire, it is only necessary to partially remove the screw bolts 9, at which time one of the sections 6 can be removed and free access had to the tire.

The many advantages of the construction of my improved rim will be readily apparent from the foregoing description taken in connection with the drawing.

I desire it to be understood that such modifications of the invention, as are permissible by the appended claims, may be resorted to without departing from the spirit and scope of the invention.

What I claim and desire to secure by Letters Patent, is:—

1. The combination with the felly and tire of a wheel, said felly having equally spaced dove-tail tapering grooves formed therein, and having a flange at the smaller end of each of said grooves, of a sectional rim adapted to engage said tire, depending dovetail tapering tongues carried by each section and adapted to fit in said grooves, screw bolts for securing the sections of said rim together, and nuts and bolts for securing said rim upon said felly.

2. The combination with the felly and tire of a wheel, said felly having dove-tail grooves formed therein, of a sectional rim adapted to engage said tire, depending tongues carried by said sections and adapted to fit in said grooves, screw bolts for securing said sections together, and means for securing said rim upon said felly.

In testimony whereof I affix my signature in the presence of two witnesses.

JOHN W. MILLER.

Witnesses:
G. MEADE GIBSON,
IDA GUIHER.